United States Patent [19]

Arakawa et al.

[11] Patent Number: 4,640,336
[45] Date of Patent: Feb. 3, 1987

[54] REFRACTORY FOR CONTINUOUS CASTING

[75] Inventors: Kazumi Arakawa; Toshiyuki Hirao; Kenji Sugiura; Satoshi Kuroki, all of Kariya; Sei Hiraki; Takao Suzuki, both of Amagasaki; Ken Nakai, Ibaragi, all of Japan

[73] Assignees: Toshiba Ceramics Co., Ltd., Tokyo; Sumitomo Metal Industries, Ltd., Osaka, both of Japan

[21] Appl. No.: 779,417

[22] Filed: Sep. 24, 1985

[30] Foreign Application Priority Data

Mar. 11, 1985 [JP] Japan ................................. 60-47846
Oct. 1, 1985 [JP] Japan ................................. 59-205966

[51] Int. Cl.⁴ ...................... B22D 11/10; B22D 41/02
[52] U.S. Cl. ..................................... 164/440; 164/490; 164/138; 222/591; 222/594
[58] Field of Search .................... 164/138, 440, 490; 222/591, 594, 597

[56] References Cited

U.S. PATENT DOCUMENTS 2,640,503  6/1953  Milligan et al. ..................... 222/591
3,386,723  6/1968  Miller ................................. 222/591

FOREIGN PATENT DOCUMENTS 129666  10/1981  Japan ................................. 164/440
6753  1/1983  Japan ................................. 164/440
1575124  9/1980  United Kingdom ................ 222/591

OTHER PUBLICATIONS

Kingery, Bowan, Uhlmann, Introduction to Ceramics, pp. 3-7 and 177-188 and 209-214, 1976.

Primary Examiner—Nicholas P. Godici
Assistant Examiner—Samuel M. Heinrich
Attorney, Agent, or Firm—Pahl, Lorusso & Loud

[57] ABSTRACT

A silicon aluminum oxynitride containing refractory for use in continuous casting is placed between a mold and a tundish and is formed by sintering an admixture of silicon nitride ($Si_3N_4$), aluminum nitride (AlN), boron nitride(BN), and a mineral clay. The refractory further includes aluminum oxide($Al_2O_3$).

10 Claims, 1 Drawing Figure

REFRACTORY FOR CONTINUOUS CASTING

BACKGROUND OF THE INVENTION

This invention relates to a refractory for use in continuous casting which is placed between a mold and a tundish.

FIG. 1 shows a conventional horizontal type continuous casting apparatus. A feed nozzle 2 is fixed to a lower portion of a tundish 1. The feed nozzle 2 is connected by way of a refractory 3 to a mold 4. The refractory 3 is positioned around an inlet of the mold 4. The molten steel 5 in the tundish 1 is poured through the feed nozzle 2 and the refractoy 3 into the mold 4 where it is cooled thereby to form a solidified shell 6 while it is continuously being drawn.

The refractory 3 must have good thermal shock resistance, wetting resistance with respect to molten steels, corrosion resistance and workability because of required precision in size.

Examples of conventional refractories are a reactive silicon nitride ($Si_3N_4$) sintered product and a hot-pressed boron nitride (BN) sintered product. The former has poor thermal shock resistance. The latter has low hardness and poor abrasion.

Other examples of conventional refractories are a $Si_3N_4$ sintered product in which BN is contained in $Si_3N_4$, a $Si_3N_4$—AlN—BN sintered product in which AlN and BN are contained in $Si_3N_4$, and a $Si_3N_4$—AlN—$Al_2O_3$—BN sintered product in which AlN, $Al_2O_3$ and BN are contained in $Si_3N_4$. The $Si_3N_4$—BN sintered product has good corrosion resistance in casting of carbon steels and poor corrosion resistance in casting of stainless steels. The $Si_3N_4$—AlN—BN sintered products are corroded in casting of carbon steels over a long period as well as in casting of stainless steels. The $Si_3N_4$—AlN—$Al_2O_3$—BN sintered products are corroded in casting of stainless steels a long period of time.

DESCRIPTION OF THE INVENTION

The object of this invention is to provide a refractory for use in continuous casting which has improved corrosion resistance and thermal shock resistance in casting of steels over a long period.

According to this invention, a refractory for use in continuous casting is provided between a continuous casting mold and a tundish which comprises silicon nitride ($Si_3N_4$), aluminum nitride (AlN), boron nitride (BN), and a clay mineral. Preferably, the refractory further contains aluminum oxide ($Al_2O_3$).

In one embodiment of this invention, the refractory consists essentially of aluminum nitride 1-80% by weight, boron nitride 1-50% by weight, the mineral clay 1-30% by weight, the remainder being silicon nitride.

In a second embodiment of this invention, the refractory consists essentially of silicon nitride 10-75% by weight, aluminum nitride 1-30% by weight, boron nitride 3-30% by weight, aluminum oxide 2-50% by weight, and the clay mineral 5-30% by weight.

It is known that a refractory consisting only of sintered $Si_3N_4$ has corrosion resistance with respect to carbon steels and reacts chemically with stainless steels to corrode. Thus, AlN having corrosion resistance as to molten steels is added in $Si_3N_4$ so that the corrosion resistance is improved. Further, $Al_2O_3$ may be added for the same purpose.

In general, corrosion resistance increases as percentage of AlN becomes large. However, in the first embodiment wherein $Si_3N_4$, AlN, BN and the clay mineral are included and $Al_2O_3$ is excluded, if the percentage of AlN is more than 80%, the strength is decreased, and if it is less than 1%, no reasonable corrosion resistance is obtained. On the other hand, in the second embodiment wherein $Al_2O_3$ is added thereto, if the percentage of AlN is more than 30%, or if the percentage of $Al_2O_3$ is more than 50%, the strength is decreased. If AlN is less than 1%, or if $Al_2O_3$ is less than 2%, no good corrosion resistance is obtained.

A refractory consisting of a body of sintered $Si_3N_4$—AlN corrodes in casting of stainless steels for a prolonged period of time. Its elasticity is increased thereby resulting in spalling due to thermal shock. Thus, BN is added into the $Si_3N_4$—AlN sintered body so that the elasticity is decreased thereby improving thermal shock resistance. Fine particles of BN are preferred. In the first embodiment, if the percentage of BN is more than 50%, the strength is suddenly decreased, and if it is less than 1%, no reasonable thermal shock resistance is obtained. In the second embodiment, if it is more than 30%, the strength is remarkably decreased, and if it is less than 3%, no thermal shock resistance is obtained.

A clay mineral is added into the $Si_3N_4$—AlN—BN sintered body so that molten steels are not easily wetted thereto. Also, alumina ($Al_2O_3$) and silica ($SiO_2$) which are the main components of a mineral clay partly react to $Si_3N_4$ and AlN to produce Sialon (Silicon Aluminum Oxynitride) expressed by $Si_{6-z}Al_zO_zN_{8-z}$ (wherein the maximum of Z is about 4.2). As a result, the thermal expansion is decreased. Alkali components of the clay mineral react with $Si_3N_4$ to produce a glass phase whereby sintering is improved while pores therein are closed by the glass phase in use so as to prevent the molten steels from entering thereinto. It also functions as a kind of lubricant between the refractory and the molten steels so that the refractory may have improved corrosion resistance. In the first embodiment, if the clay mineral is more than 30%, too much glass phase is formed so that the the desired characteristics decrease at high temperatures, and if it is less than 1%, the molten steels well wet the refractory while the sintering characteristic is decreased. In the second embodiment, if the clay mineral is more than 30%, the glass phase is formed too much so that the characters at high temperatures decrease, and if it is less than 5%, the molten steel well wets the refractory while the sintering characteristic is decreased.

Examples of preferred clay minerals are montmorillonite such as bentonite and acid clay, or illite such as sericite and white mica.

For instance, if bentonite is added into sialon, the $Al_2O_3$—$SiO_2$ composition which is a main composition of bentonite is partly in solid solution within the sialon, and the alkali component thereof reacts to the sialon thereby to produce a glass phase so as to promote bonding between particles thereof whereby porosity and wetting chracteristics are decreased.

A method for making such a refractory for continuous casting will be explained. The above-stated compositions ($Si_3N_4$, AlN, BN, $Al_2O_3$, a clay mineral) are blended in a predetermined ratio and formed by a suitable forming means so as to obtain a formed body. The formed body is heated at a sintering temperature of 1450°–1800° C. for about 1-10 hours within non-oxidation atmosphere such as argon gas or nitrogen gas.

This invention is not limited to such a sintering method. A refractory can be reactive-sintered within nitrogen gas where Si is used.

According to this invention, corrosion resistance and thermal shock resistance of a refractory for use in continuous casting can be remarkably improved. A solidified shell can be prevented from damaging the refractory. Stainless steels and high alloy steels can be continuously cast over a long period.

EMBODIMENTS

Figure 1:
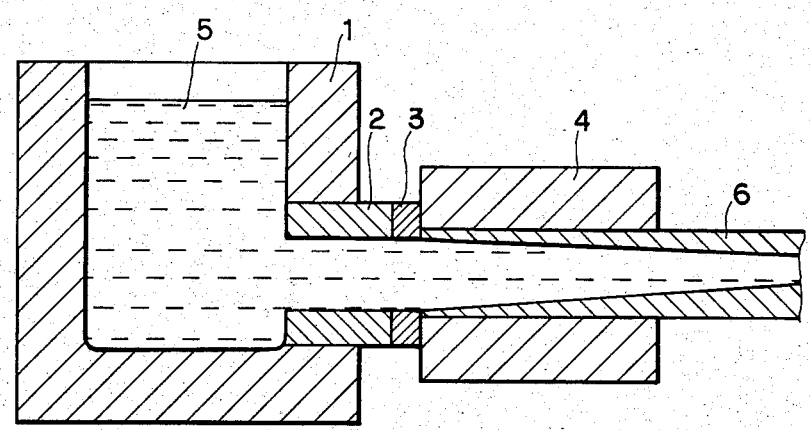
FIG. 1 is a schematic sectional view showing an example of horizontal type continuous casting equipment in which either a conventional refractory or a refractory according to this invention can be used.

As shown in Table 1, sample Nos. 1-8 are made as a refractory for use in continuous casting according to this invention, and sample Nos. 9-10 are produced as comparative examples of a conventional refractory.

Each of sample Nos. 1-10 is produced as follows:

As shown in Table 1, the compositions are blended in a predetermined ratio and sufficiently mixed by a mixer. After that, an organic binder such as PVA is added thereto and mixed together thereby to produce a mixture. Next, the mixture is pressed by a hydraulic press machine under a pressing pressure of 1 ton/cm$^2$ so as to form a ring having an outer diameter of 220 mm, an inner diameter of 190 mm and a thickness of 15 mm, and a square post having a height of 20 mm, a width of 20 mm and a length of 120 mm. Such posts and rings are dried and then heated at 1700° C. for 5 hours within a nitrogen gas atmosphere to be sintered.

As shown in Table 2, the physical properties of Samples No. 1-No. 8 of a refractory according to this invention indicate that the porosity is decreased and the strength is remarkably increased.

The samples in a post shape are used for corrosion resistance tests and contact angle tests.

In the corrosion resistance tests, each of a carbon steel (S50C) and an austenite stainless steel (SUS 310: 25Cr—20Ni) is melted by 10 Kg in a high-frequency furnace. The samples are immersed into such molten steels at 1550° C. for one hour. Thereafter, damages of the samples are measured.

In the contact angle tests, stainless steels and carbon steels are put on the samples and then heated at 1500° C. while the contact angles are measured by a high-temperature microscope.

As shown in Table 3, the corrosion depth of Samples No. 9-No. 10 are relatively deep. According to this invention, the corrosion depth of Samples No. 1-No. 8 is zero in case of carbon steels and 0.1 mm or less in case of stainless steels. Thus, it is recognized that the corrosion resistance of a refractory is remarkably improved according to this invention.

The samples in a ring shape are set between the mold 4 and the tundish 1 in a horizontal type continuous casting equipment as shown in FIG. 1. Round billets of austenite stainless steel (SUS 304: 18Cr—8Ni) are cast in the amount of 20 ton under the conditions of mold diameter 212 mm, drawing speed 0.8 m/min., and drawing length 75 m.

Table 4 shows test results of corrosion depth of the refractory 3 by the solidified shell 6. In samples No. 12-No. 19 according to this invention, the corrosion depth is 0.1-0.2 mm so that stable casting can be carried out without any troubles. The mold surface is good. In Sample Nos. 20-21 of a conventional refractory, the corrosion depth is so large that the mold end may be damaged.

Although in the above-stated embodiments a refractory is formed in a ring shape or a square post, this invention is not limited thereto and includes any desired shape of refractory. Also, this invention can be applied to a vertical type, a curved type or any other type continuous casting equipments.

TABLE 1

| Sample No. | Compositions (% by weight) | | | | |
| --- | --- | --- | --- | --- | --- |
| | $Si_3N_4$ | AlN | $Al_2O_3$ | BN | Bentonite |
| 1 | 50 | 20 | — | 20 | 10 |
| 2 | 60 | 10 | 10 | 15 | 5 |
| 3 | 55 | 10 | 10 | 15 | 10 |
| 4 | 35 | 50 | — | 10 | 5 |
| 5 | 50 | 20 | — | 20 | 10 |
| 6 | 30 | 20 | — | 40 | 10 |
| 7 | 40 | 20 | — | 20 | 20 |
| 8 | 15 | 70 | — | 10 | 5 |
| 9 | 70 | 7 | 8 | 15 | — |
| 10 | 60 | 20 | — | 20 | — |

TABLE 2

| Sample No. | Physical Property | | |
| --- | --- | --- | --- |
| | Apparent Porosity (%) | Bulk Specific Gravity | Modulus of Rupture (Kg/cm$^2$) |
| 1 | 21.3 | 2.45 | 1370 |
| 2 | 19.8 | 2.51 | 1800 |
| 3 | 16.2 | 2.55 | 2150 |
| 4 | 23.0 | 2.16 | 950 |
| 5 | 22.8 | 2.15 | 1000 |
| 6 | 24.2 | 2.13 | 680 |
| 7 | 21.4 | 2.17 | 900 |
| 8 | 27.5 | 2.25 | 800 |
| 9 | 25.5 | 2.15 | 1050 |
| 10 | 26.2 | 2.10 | 540 |

TABLE 3

| Sample No. | Test Results | | Contact Angle (degree) |
| --- | --- | --- | --- |
| | Corrosion Depth (mm) | | |
| | Carbon Steels | Stainless Steels | |
| 1 | 0 | 0.1 or less | 115 |
| 2 | 0 | 0.1 or less | 110 |
| 3 | 0 | 0.1 or less | 110 |
| 4 | 0 | 0.1 or less | 110 |
| 5 | 0 | 0.1 or less | 110 |
| 6 | 0 | 0.1 or less | 115 |
| 7 | 0 | 0.1 or less | 110 |
| 8 | 0 | 0.1 or less | 115 |
| 9 | 0.8 | 1.5 | 100 |
| 10 | 3.0 | 5.0 | 90 |

TABLE 4

| Sample No. | Corrosion Depth (mm) |
| --- | --- |
| 12 | 0.1 |
| 13 | 0.1 |
| 14 | 0.1 |
| 15 | 0.1 |
| 16 | 0.1 |
| 17 | 0.1 |
| 18 | 0.2 |
| 19 | 0.1 |
| 20 | 2.5 |
| 21 | 5.0 |

We claim:

1. A refractory article for connecting a mold and a tundish in continuous casting, said refractory article containing silicon aluminum oxynitride produced by heating an admixture consisting essentially of:
1-80 wt. % aluminum nitride,
1-50 wt. % boron nitride,
1-30 wt. % clay mineral, and
the remainder being silicon nitride,
said clay mineral containing alumina, silica and an alkali component, whereby said silica and alumina react with said aluminum nitride and said silicon nitride to produce the silicon aluminum oxynitride and said alkali component reacts with said silicon nitride to produce a glass phase within the refractory.

2. A refractory as claimed in claim 1 wherein the mineral clay is montmorillonite.

3. A refractory as claimed in claim 1, wherein the mineral clay is bentonite or acid clay.

4. A refractory as claimed in claim 1, wherein the mineral clay is illite.

5. A refractory as claimed in claim 1, wherein the mineral clay is sericite or white mica.

6. A refractory article for connecting a mold and a tundish in continuous casting, said refractory article containing silicon aluminum oxynitride produced by heating an admixture consisting essentially of:
10-75 wt. % silicon nitride,
1-30 wt. % aluminum nitride,
3-30 wt. % boron nitride,
5-30 wt. % clay mineral, and
2-50 wt. % alumina,
said clay mineral containing alumina, silica and an alkali component, whereby said silica and alumina react with said aluminum nitride and said silicon nitride to produce the silicon aluminum oxynitride and said alkali component reacts with said silicon nitride to produce a glass phase within the refractory.

7. A refractory as claimed in claim 6, wherein the mineral clay is montmorillonite.

8. A refractory as claimed in claim 6, wherein the mineral clay is bentonite or acid clay.

9. A refractory as claimed in claim 6, wherein the mineral clay is illite.

10. A refractory as claimed in claim 6, wherein the mineral clay is sericite or white mica.

* * * * *